(12) United States Patent
Yu et al.

(10) Patent No.: US 7,169,721 B2
(45) Date of Patent: Jan. 30, 2007

(54) SELF-FOAMED POROUS CERAMIC COMPOSITION AND METHOD FOR MAKING POROUS CERAMIC USING THE SAME

(75) Inventors: Hyun Seung Yu, Seoul (KR); Kug Sun Hong, Seoul (KR); Hwan Kim, Bucheon-si (KR); Dong Ho Lee, Seoul (KR); Choon Ki Lee, Seoul (KR); Bong Soon Chang, Seoul (KR); Deug Joong Kim, Seoul (KR); Jun Hyuk Seo, Seoul (KR); Jae Hyup Lee, Seoul (KR); Ki Soo Park, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 516 days.

(21) Appl. No.: 10/648,220

(22) Filed: Aug. 27, 2003

(65) Prior Publication Data
US 2004/0053766 A1    Mar. 18, 2004

(30) Foreign Application Priority Data
Aug. 28, 2002    (KR) .................. 10-2002-0051243

(51) Int. Cl.
C03C 11/00    (2006.01)
C03C 3/085    (2006.01)
C03B 19/00    (2006.01)
C03B 19/01    (2006.01)
C03B 19/08    (2006.01)

(52) U.S. Cl. ................ 501/39; 65/17.3; 65/22; 65/17.6; 501/65

(58) Field of Classification Search ............ 501/39, 501/65; 65/17.3, 17.6, 22
See application file for complete search history.

(56) References Cited

U.S. PATENT DOCUMENTS

| | | | | |
|---|---|---|---|---|
| 2,582,852 A * | 1/1952 | Shoemaker | ............... | 501/39 |
| 3,207,588 A * | 9/1965 | Games et al. | ............... | 65/21.4 |
| 3,325,341 A * | 6/1967 | Shannon | ............... | 428/406 |
| 3,365,315 A * | 1/1968 | Beck et al. | ............... | 501/33 |
| 3,459,565 A * | 8/1969 | Jones et al. | ............... | 501/39 |
| 3,459,630 A * | 8/1969 | Eustachio et al. | ............... | 428/178 |
| 3,793,039 A * | 2/1974 | Rostoker | ............... | 501/27 |
| 4,552,577 A * | 11/1985 | Varshneya et al. | ............... | 65/22 |
| 4,621,066 A * | 11/1986 | Nishigaki et al. | ............... | 501/128 |
| 5,820,647 A * | 10/1998 | Hsu et al. | ............... | 65/17.3 |
| 5,830,767 A * | 11/1998 | Bauman et al. | ............... | 436/527 |
| 2004/0043053 A1 * | 3/2004 | Yu et al. | ............... | 424/426 |

* cited by examiner

Primary Examiner—J. A. Lorengo
Assistant Examiner—Elizabeth A. Bolden
(74) Attorney, Agent, or Firm—Rosenberg, Klein & Lee (57) ABSTRACT

Disclosed herein are a self-foamed porous ceramic composition and a method for making a porous ceramic using the self-foamed porous ceramic composition. The self-foamed porous ceramic is obtained by fabricating a glass consisting of 41~47 mole % of calcium oxide (CaO), 41~47 mole % of silica ($SiO_2$) and 6~18 mole % of borate ($B_2O_3$), pulverizing the glass into a finely-divided glass powder having an average particle size of 1~10 μm, molding the glass powder, and sintering the molded glass powder.

4 Claims, 8 Drawing Sheets

SELF-FOAMED POROUS CERAMIC COMPOSITION AND METHOD FOR MAKING POROUS CERAMIC USING THE SAME

BACKGROUND OF THE INVENTION

1. Field of the Invention

The present invention relates to a self-foamed porous ceramic composition and a method for making a porous ceramic using the self-foamed porous ceramic composition. More particularly, the present invention relates to a self-foamed porous ceramic composition containing a foamable component capable of generating gas at high temperature, and a method for making a porous ceramic with a high porosity and strength wherein the porous ceramic is made by fabricating the self-foamed porous ceramic composition into a glass, pulverizing the glass into powders, and sintering the glass powder compact to densify and rapidly foam it.

2. Description of the Related Art

Currently used porous ceramics are made by any one of the following processes: i) a process including pre-sintering a ceramic at a temperature not higher than the optimum sintering temperature, ii) a process including mixing a ceramic powder with spherical polymer beads and burning out the polymer beads by heating to form pores therein, and iii) a process including coating a polymer sponge with a ceramic and burning out the polymer sponge to form sponge-type pores, etc.

The pre-sintering process has an advantage that porous ceramics can be easily made, but is disadvantageous in that the porous ceramics have a low strength and their pores have a relatively small size and non-uniform size distribution. Since the process using spherical polymer beads is limited in the amount of the beads added, it is difficult to make porous ceramics having a porosity of 60% or higher. U.S. Pat. No. 3,090,094 (1963) discloses a porous ceramic made using a sponge. The porous ceramic is advantageous in terms of high porosity (60~90%). However, since the walls defining the pores have a small thickness, the mechanical strength of the porous ceramic is poor. To increase the low mechanical strength, the sponge must be repeatedly coated.

On the other hand, self-foamed porous ceramics are characterized in that they exhibit higher strength with higher porosity than conventional porous ceramics. Currently used self-foamed porous ceramics have been made by mixing a ceramic powder with a polymer foam at room temperature or higher. U.S. Pat. No. 3,833,386 (1974) discloses a porous ceramic made by mixing a ceramic with a polymer foam at room temperature. The porous ceramic exhibits a relatively high strength and its pores have a relatively small pore size of not more than 100 μm, compared to the porous ceramics using sponges. However, the porous ceramic has disadvantages that its pore size and porosity cannot be appropriately controlled and the ceramic content is difficult to control. When a porous ceramic is made using a foamable polymer at high temperature, the polymer is oxidized at high temperature and decomposed into gases such as nitrogen, carbon dioxide, water vapor, etc. which form pores. However, the porous ceramic has disadvantages that its pore size and porosity cannot be appropriately controlled due to difficult control of pore formation, and the strength is low.

Presently known and commercially available porous ceramics are made by the processes discussed above. The problem is that the higher the porosity of the porous ceramics is, the lower the strength is.

SUMMARY OF THE INVENTION

Therefore, the present invention has been made in view of the above problems, and it is an object of the present invention to provide a porous ceramic composition containing an inorganic foaming agent foamed at high temperature, instead of a foamable polymer, wherein the inorganic foaming agent is self-foamed after sintering, so that the sintered porous ceramic has a high porosity and mechanical strength.

It is another object of the present invention to provide a porous ceramic for artificial bones which has a high porosity and mechanical strength and which is ductile and bioactive.

It is yet another object of the present invention to provide a method for making a porous ceramic using a self-foamable component. Since the method eliminates the need for additional steps for the formation of pores, it allows the porous ceramic to be simply made in accordance with common ceramic making processes.

In order to accomplish the above objects of the present invention, there is provided a self-foamed porous ceramic composition comprising 41~47 mole % of calcium oxide (CaO), 41~47 mole % of silica ($SiO_2$) and 6~18 mole % of borate ($B_2O_3$).

In accordance with one aspect of the present invention, there is provided a method for making a porous ceramic, comprising the steps of: fabricating a glass consisting of CaO, $SiO_2$ and $B_2O_3$; pulverizing the glass into a finely-divided glass powder having an average particle size of 1~10 μm; molding the glass powder using a press; and sintering the molded glass powder at 950~1,200° C. to self-foam the molded powder.

The glass as a raw material for the porous ceramic consists of 41~47 mole % of calcium oxide (CaO), 41~47 mole % of silica ($SiO_2$) and 6~18 mole % of $B_2O_3$. $B_2O_3$ is volatilized at a temperature of above 900° C. and is converted to $B_2O_3$ gas, which forms pores inside the glass. $B_2O_3$ is in a highly compact glass state just before being volatilized. At this time, although a small amount of $B_2O_3$ gas is generated, the gas cannot escape from the glass and thus can form large pores inside the glass. In addition, since the surrounding matrix is a viscous glass, it is not broken by the formed pores. If the surrounding matrix is common ceramic grains, the ceramic is broken by cracks which occur because of the formed pores.

When the respective contents of calcium oxide and silica are less than 41 mole %, the formation into a glass is impossible. When the respective contents of calcium oxide and silica exceed 47 mole %, a glass is possibly formed but the formation of pores is unsatisfactory due to too small an amount of $B_2O_3$ gas being volatilized.

It is preferred to pulverize the glass into particles having an average particle size of 1~10 μm. When the particle size exceeds 10 μm, the volatilized $B_2O_3$ cannot foam the glass. This is because the coarse particles impede compactness. The glass powder is then mixed with 10% by weight of water to granulate the glass powder. Generally, since glass has a high hardness, it cannot be pulverized into particles having an average particle size of 1 μm or smaller using common ceramic processes. Accordingly, the average particle size of the glass is preferably within the range of 1~10 μm.

On the other hand, as the sintering temperature for self-foaming the glass powder increases, the porosity is high and the pore size is large. However, since there is a risk that a number of pores may gather together to form larger pores, sintering at too high a temperature should be avoided.

The porous ceramic thus made is a glass-ceramic which is composed of crystalline β-wollastonite ($CaSiO_3$), crystalline silica ($SiO_2$, β-quartz or cristobalite) and a residual glassy phase.

Borate ($B_2O_3$), the most important component in the composition, acts as an inorganic foaming agent. When the borate content is less than 6 mole %, the foaming effect is insufficient. When the borate content exceeds 18 mole %, compactness of the glass powder is not achieved. Accordingly, when the volatilization of borate begins, the borate gas can escape through pores between the particles and thus pores are not formed.

Figure 1:
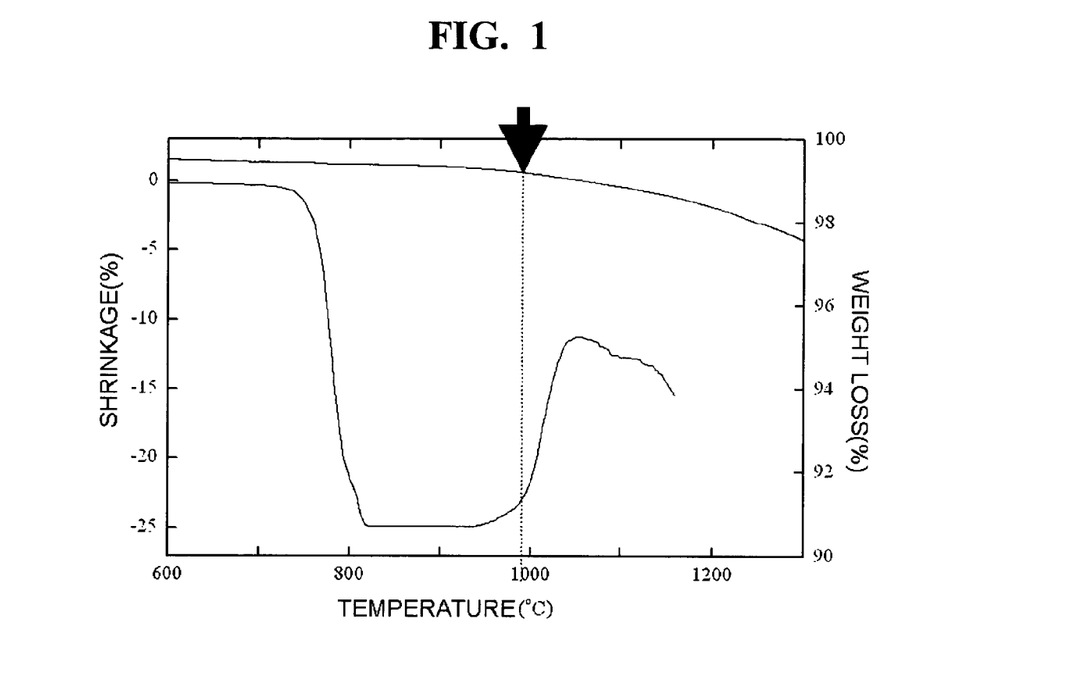
FIG. 1 is a graph showing the volume shrinkage with increasing temperature and the weight loss due to the volatilization of $B_2O_3$ during sintering a molded body composed of a glass powder in accordance with the present invention.
Figure 2A:
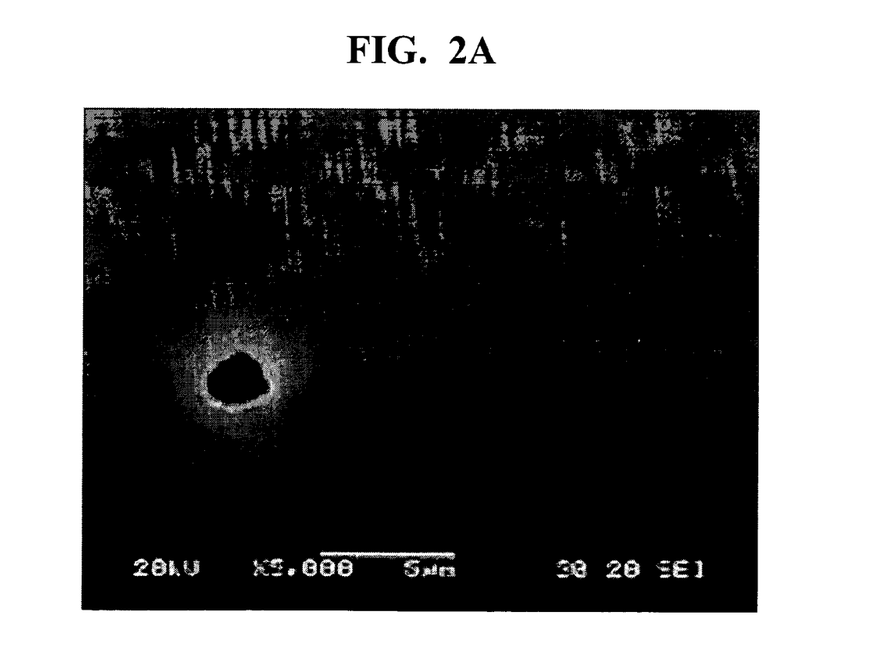
FIGS. 2a to 2f are electron microscope images after sintering molded bodies composed of a glass powder (CaO: 45.8 mole %, $SiO_2$: 45.8 mole % and $B_2O_3$: 8.4 mole %) for 15 minutes at various temperatures, respectively.
Figure 2B:
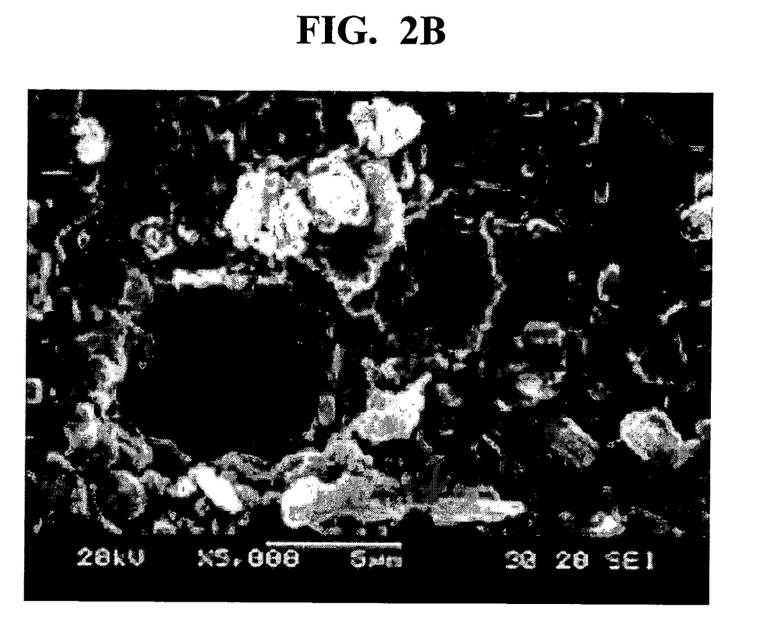
Figure 2C:
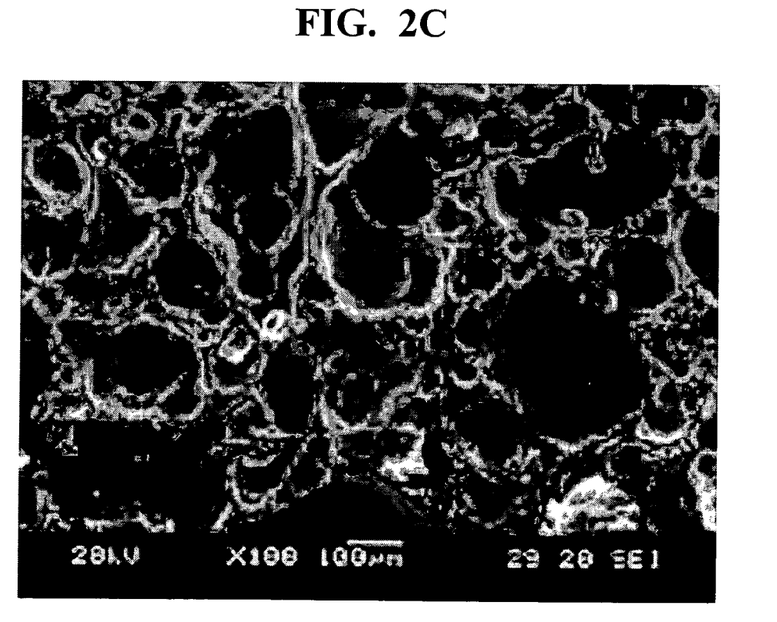
Figure 2D:
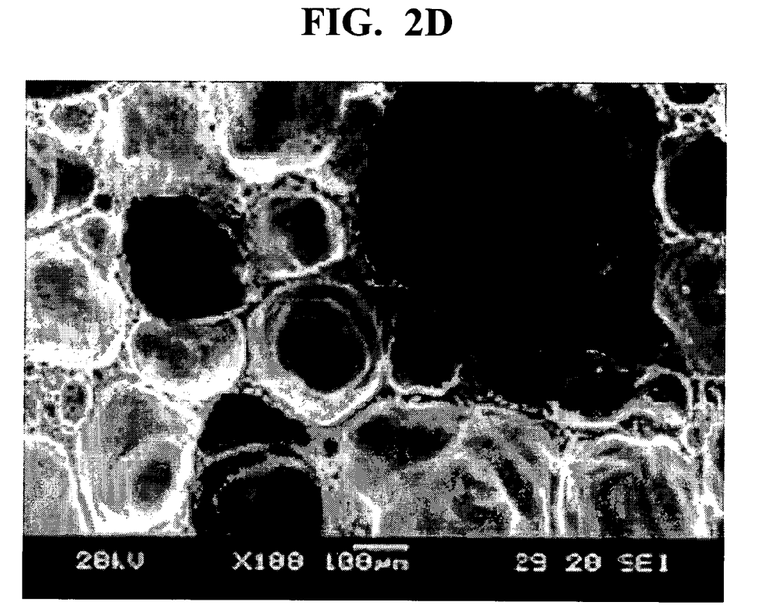
Figure 2E:
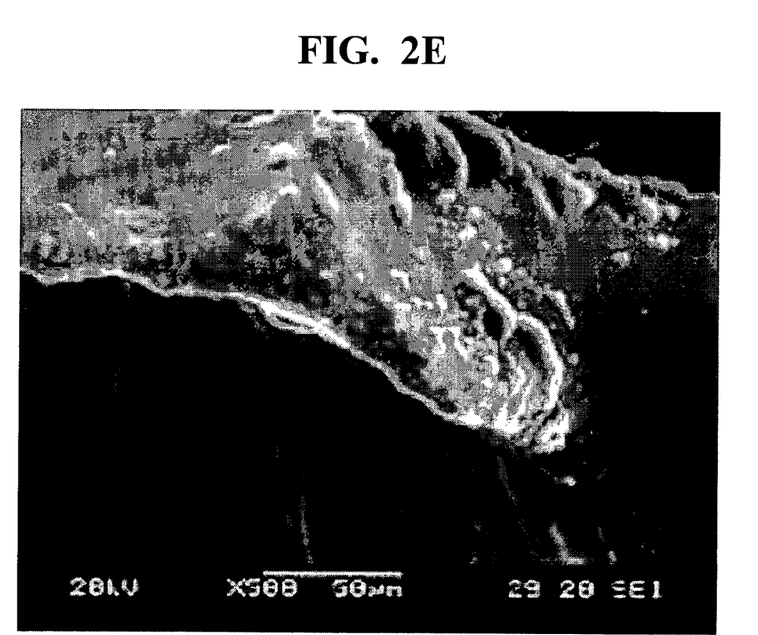
Figure 2F:
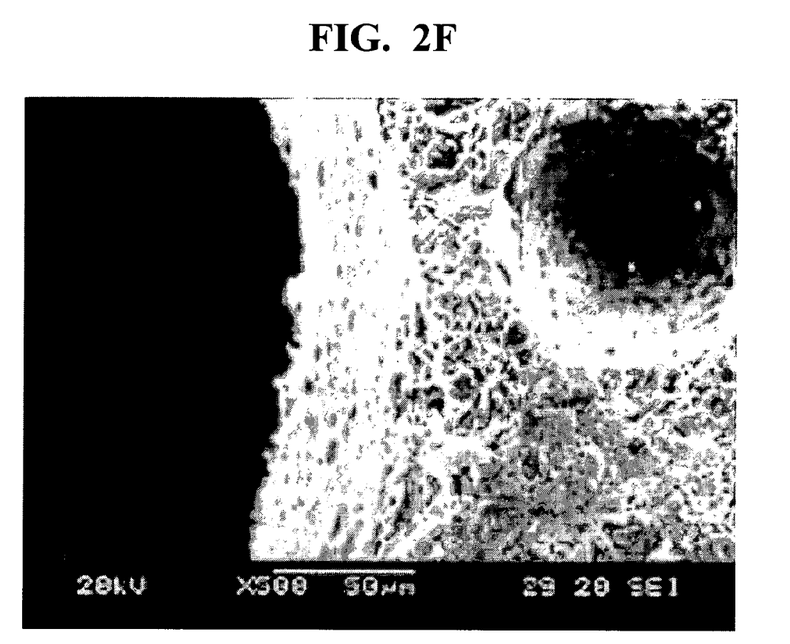

As shown in FIG. 1, a molded body composed of the glass powder is completely compacted at a temperature of 700~850° C. When the temperature is above 950° C., the molded body is greatly reduced in weight due to the volatilization of $B_2O_3$, and at the same time, is expanded in volume (self-foaming step). When the temperature is above 1,200° C., the formed pores are excessively grown to a size of 5 mm or larger and thus the desired porous ceramic cannot be made. Accordingly, the sintering temperature is preferably within the range of 950~1200° C.

The molded body composed of the glass powder is then sintered. At this time, the molded body becomes compact with increasing temperature. When the sintering temperature increases, the molded body is greatly reduced in weight due to the volatilization of $B_2O_3$, and at the same time, is expanded in volume (self-foaming step) to make the desired porous ceramic.

The porous ceramic thus made was found to include β-wollastonite ($CaSiO_3$) and to form a carbonate apatite layer when reacted with a simulated body fluid. That is, the porous ceramic of the present invention has excellent bioactivity.

As described above, since the self-foamed porous ceramic composition of the present invention comprises a self-foamable component, the porous ceramic has a high porosity and strength and is ductile. In addition, the method for making the porous ceramic of the present invention eliminates the need for additional steps for the formation of pores and allows the porous ceramic to be simply made using common ceramic making processes. The porous ceramic of the present invention can be applied to insulating materials, catalyst supports, medical applications such as artificial bones, and other applications.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

EXAMPLE

Hereinafter, the present invention will be described in more detail with reference to the following Examples. However, these Examples are given for the purpose of illustration and are not to be construed as limiting the scope of the invention.

Examples 1 to 5

First, calcium carbonate ($CaCO_3$) (purity: 99.99%), silica ($SiO_2$) (purity: 99.9%) and borate ($B_2O_3$) (purity: 99.9%) were weighed so that the molar ratio of $CaO:SiO_2:B_2O_3$ was 45.8%: 45.8%: 8.4%, and subjected to a dry mixing process. The mixture was placed in a platinum crucible, and gradually heated to 1450° C. While maintaining the mixture at this temperature for 2 hours, the mixture was completely melted. The molten mixture was taken out from the crucible, and poured into a stainless steel mold to fabricate a glass.

The glass thus fabricated was pulverized using an alumina mortar to pass through a sieve (180 μm), and further pulverized in a planetary mill with zirconia balls at 200 rpm for 5 hours to obtain a glass powder having an average particle size of 1~10 μm. After the obtained glass powder was mixed with 10% by weight of water to granulate the mixture, the granulated mixture was poured into a stainless steel mold and molded under an appropriate pressure to form a molded body. The molded body was sintered at various temperatures between 1000~1200° C. for 15 minutes to make respective test pieces. The microstructures of the test pieces are shown in FIGS. 2a to 2f, respectively. The porosity and the specific surface area of the test pieces were measured. The results are shown in Table 1 below.

TABLE 1

| | Sintering Temperature (° C.) | Density (g/cm$^3$) | Porosity (%) | Specific surface area (m$^2$/g) |
|---|---|---|---|---|
| Example 1 | 1000 | 0.90 | 66.7 | 0.09 |
| Example 2 | 1050 | 0.65 | 76.9 | 0.31 |
| Example 3 | 1100 | 0.46 | 82.9 | 0.02 |
| Example 4 | 1150 | 0.30 | 88.9 | — |
| Example 5 | 1200 | 0.28 | 89.8 | — |

As can be seen from Table 1 above, the porous ceramics of the present invention had a high porosity of 66.7~89.8%, and a specific surface area of 0.02~0.31 m$^2$/g. Comparing with a conventional porous ceramic having a porosity (75~85%) comparable to the porous ceramic of the present invention, made by a polymer sponge method, the conventional porous ceramic had a specific surface area of 0.02 m$^2$/g. Accordingly, the porous ceramic of the present invention had a specific surface area up to 10 times larger than the conventional porous ceramic.

Figure 3:
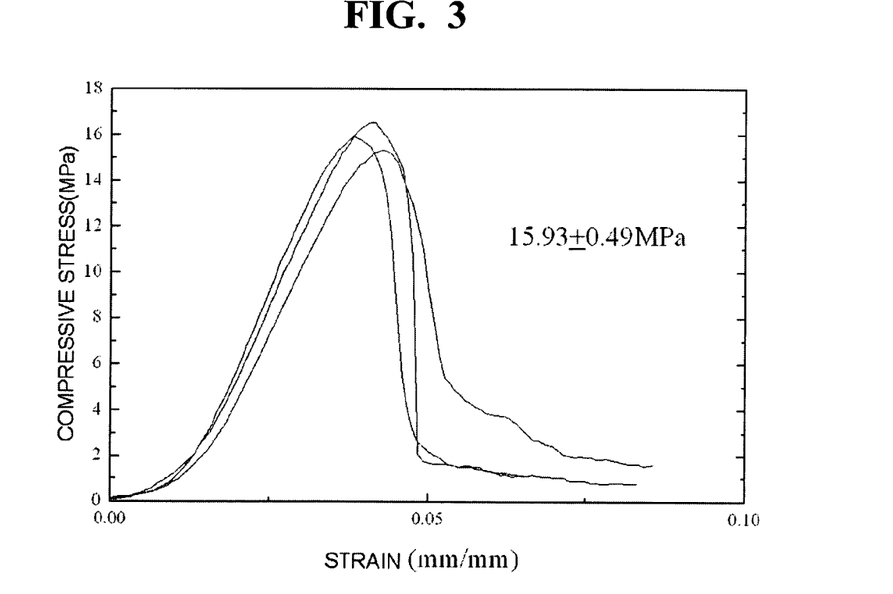
FIG. 3 is a graph showing the strength and the strain after compressive stress measurements of a porous ceramic according to the present invention.

The compressive stress of the test piece (Example 3) sintered at 1100° C. for 15 minutes was measured. The results are shown in FIG. 3.

Although the test piece had a porosity of 82.9%, the compressive stress was as high as 16 MPa. Comparing with a conventional porous ceramic having a porosity comparable to the test piece, the conventional porous ceramic showed a compressive stress of 1~3 MPa. Accordingly, the porous ceramic of the present invention showed a significantly larger compressive stress than the conventional porous ceramic.

In addition to compressive stress, elastic modulus is an important property. The compressive modulus was measured to be 0.6±0.03 GPa from the slope of the stress-strain curve shown in FIG. 3. This value is very low compared to conventional highly brittle ceramics. This demonstrates that the porous ceramic of the present invention has excellent ductility and properties similar to those of polymers. Accordingly, the porous ceramic of the present invention has a high strength, and at the same time, improves ductility which is a drawback of conventional brittle ceramics.

Figure 4:
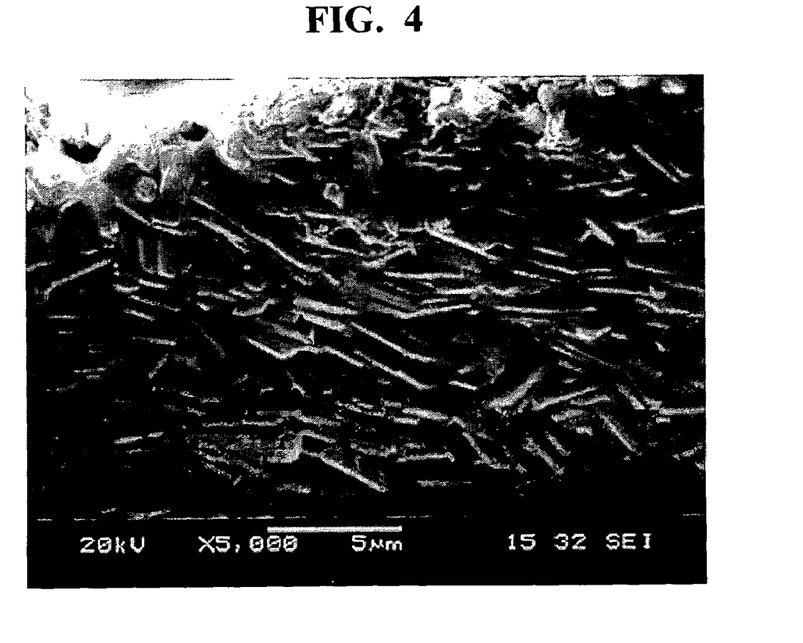
FIG. 4 is an electron microscope image showing the microstructure of a porous ceramic according to the present invention.

An electron microscope image showing the microstructure of the porous ceramic according to the present invention is shown in FIG. 4. As shown in FIG. 4, 5 μm long particles are aligned in a line around the pore walls. In addition, it was observed that there are no or few micropores between the particles, the pore walls are very thick and needle-shaped particles are well aligned. Accordingly, the porous ceramic of the present invention shows a resistance to an externally applied force, and thus shows a high compressive stress.

(Evaluation of Bioactivity)

Figure 5A:
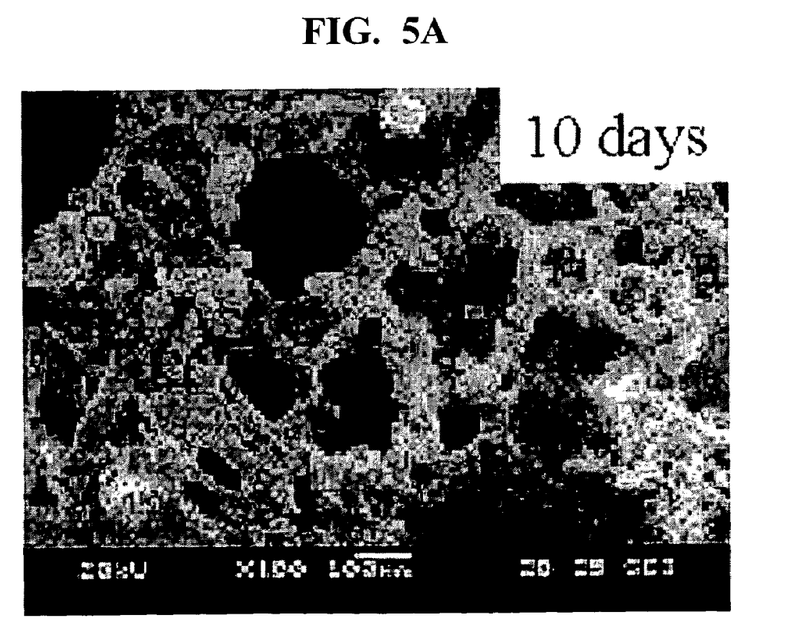
FIGS. 5a and 5b are electron microscope images showing the surfaces of test pieces taken out 10 days after soaking in simulated body fluid.
Figure 5B:
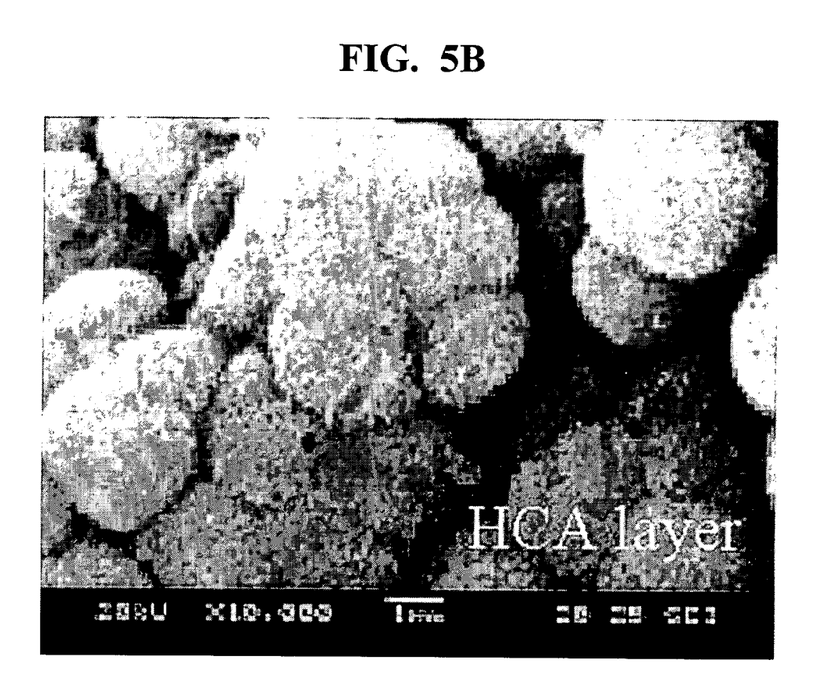

The porous ceramics of the Examples consist of calcium oxide (CaO) and silica (SiO₂). To see if the porous ceramics are bioactive, the porous ceramics were soaked in simulated body fluid (SBF), and then the surface changes were observed using an electron microscope. The results are shown in FIGS. 5a and 5b. As shown in FIG. 5a, 10 days after the soaking, carbonate apatite layers similar to inorganic ingredients of bones were formed in the test piece. The presence of the carbonate apatite layers demonstrates that the porous ceramic of the present invention is bioactive.

To evaluate the cytotoxicity of the porous ceramic according to the present invention, extracts from a negative control and the self-foamed porous ceramic were cell-cultured.

Figure 6A:
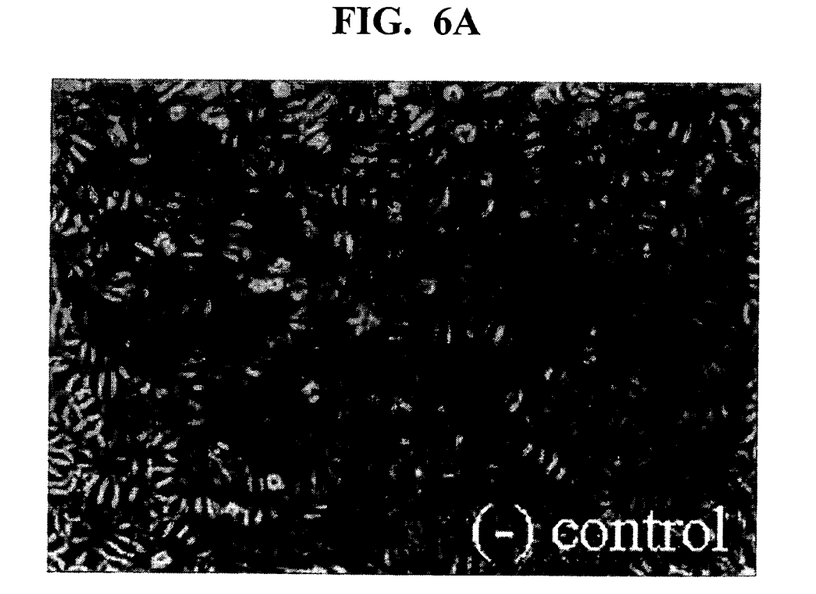
FIGS. 6a and 6b show optical microscope images of the cell cultures of extracts from a negative control and a self-foamed porous ceramic, respectively.
Figure 6B:
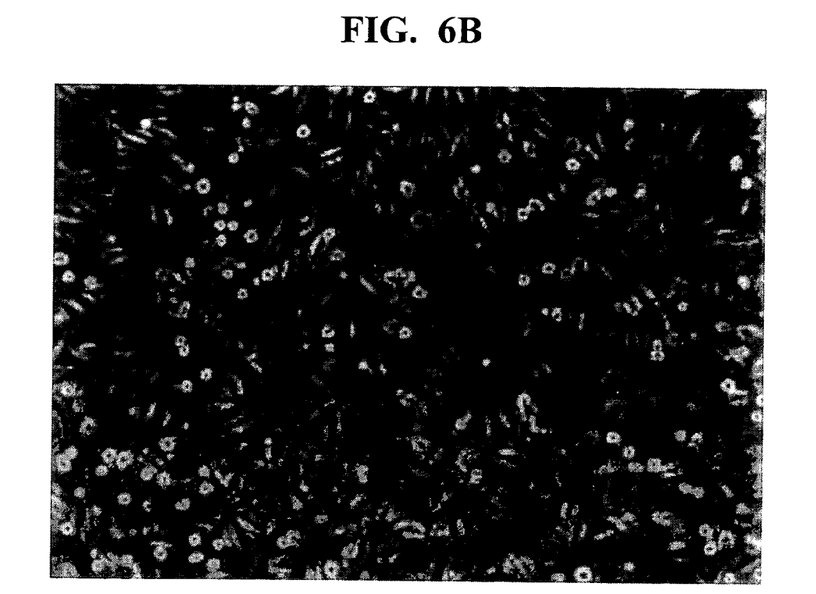

As can be seen from FIG. 6b, the cytotoxicity test on the porous ceramic of the present invention reveals that there are no significant differences in cytolysis, compared to the negative control.

Examples 6 to 8

First, calcium carbonate (CaCO₃) (purity: 99.99%), silica (SiO₂) (purity: 99.9%) and borate (B₂O₃) (purity: 99.9%) were weighed so that the molar ratio of CaO:SiO₂:B₂O₃ was 43.6%: 43.6%: 12.8%, and subjected to a dry mixing process. The mixture was placed in a platinum crucible, and gradually heated to 1450° C. While maintaining the mixture at this temperature for 2 hours, the mixture was completely melted. The molten mixture was taken out from the crucible, and poured into a stainless steel mold to fabricate a glass.

Figure 7A:
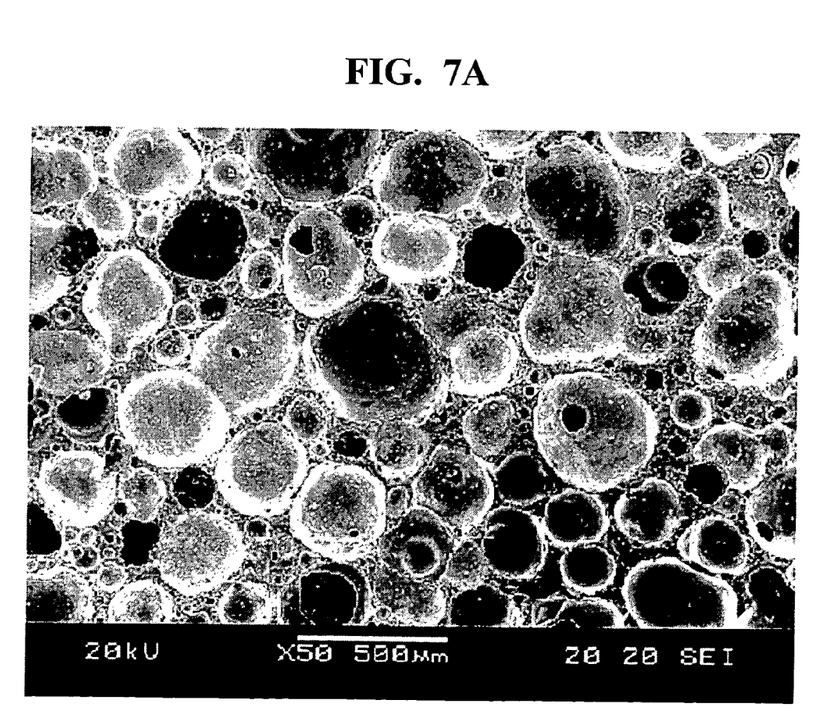
FIGS. 7a to 7b are electron microscope images after sintering molded bodies composed of a glass powder (CaO: 43.6 mole %, $SiO_2$: 43.6 mole % and $B_2O_3$: 12.8 mole %) for 15 minutes at various temperatures, respectively.
Figure 7B:
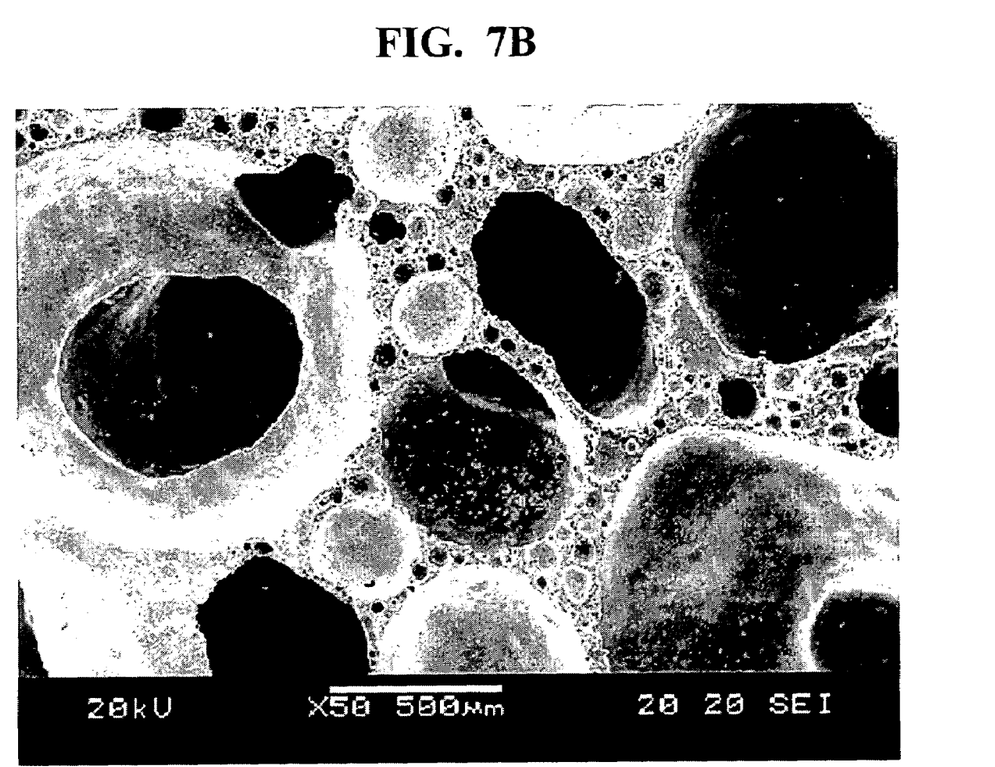

The glass thus fabricated was pulverized using an alumina mortar to pass through a sieve (180 μm), and further pulverized in a planetary mill with zirconia balls at 200 rpm for 5 hours to obtain a glass powder having an average particle size of 1~10 μm. After the obtained glass powder was mixed with 10% by weight of water to granulate the mixture, the granulated mixture was poured into a stainless steel mold and molded under an appropriate pressure to form a molded body. The molded body was sintered at various temperatures between 950~1,050° C. for 15 minutes to make respective test pieces. The microstructures of the test pieces are shown in FIGS. 7a to 7b, respectively. The porosity, specific surface area and compressive stress of the test pieces were measured. The results are shown in Table 2 below.

TABLE 2

| | Sintering Temperature (° C.) | Density (g/cm³) | Porosity (%) | Specific surface area (m²/g) | Compressive stress (MPa) |
|---|---|---|---|---|---|
| Example 6 | 950 | 0.60 | 77.2 | 0.21 | 16.2 ± 1.9 |
| Example 7 | 1000 | 0.46 | 82.2 | 0.06 | 6.0 ± 1.7 |
| Example 8 | 1050 | 0.33 | 87.4 | 0.01 | 4.0 ± 0.6 |

As can be seen from Table 2 above, the porous ceramics of the present invention had a high porosity of 77.2~87.4%, and a specific surface area of 0.01~0.21 m²/g.

Although the test piece (Example 6) had a porosity of 77.2%, the compressive stress was as high as 16 MPa. However, the test pieces (Examples 7 and 8) having a porosity higher than 77.2% had far lower compressive stress. This is because the larger the pore size is, the lower the compressive stress is.

In conclusion, since the porous ceramic of the present invention is bioactive and nontoxic, it is biocompatible and thus can be applied to medical applications such as artificial bones.

As apparent from the above description, since the self-foamed porous ceramic composition of the present invention comprises a self-foamable component, the porous ceramic has a high porosity and high strength and is ductile. In addition, the method for making the porous ceramic of the present invention eliminates the need for additional steps for the formation of pores and allows the porous ceramic to be simply made using common ceramic making processes. The porous ceramic of the present invention can be applied to insulating materials, catalyst supports, medical applications such as artificial bones, and other applications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A self-foamed porous ceramic composition comprising calcium oxide, silica, and borate wherein the calcium oxide and the silica form a glass, and the borate is self-foamed, the composition comprising about 41 to about 47 mole % of calcium oxide (CaO), about 41 to about 47 mole % of silica (SiO₂) and about 6 to about 18 mole % of borate (B₂O₃).

2. A method for making a self-foamed porous ceramic, comprising the steps of: fabricating a glass consisting of about 41 to about 47 mole % of calcium oxide (CaO), about 41 to about 47 mole % of silica (SiO₂) and about 6 to about 18 mole % of borate (B₂O₃); pulverizing the glass into a finely-divided glass powder having an average particle size of about 1 to about 10 μm; molding the glass powder; and sintering the molded glass powder.

3. The method for making a self-foamed porous ceramic according to claim 2, wherein the sintering is carried out at a temperature of about 950 to about 1,200° C.

4. The method for making a self-foamed porous ceramic according to claim 2, wherein the porous ceramic is bioactive.

* * * * *